May 10, 1955     J. E. MURPHY ET AL     2,708,028
FRUIT CONTAINER

Filed Jan. 28, 1953     2 Sheets-Sheet 1

INVENTORS
JOSEPH E. MURPHY
MURRAY SCHNALL
BY

ATTORNEY.

United States Patent Office 2,708,028
Patented May 10, 1955

2,708,028

FRUIT CONTAINER

Joseph E. Murphy, Hicksville, and Murray Schnall, Brooklyn, N. Y., assignors to See-Qual Package Corp., New York, N. Y., a corporation of New York Application January 28, 1953, Serial No. 333,723

3 Claims. (Cl. 206—45.33)

This invention relates to fruit containers, more particularly to wrapped trays for housing one or more rows of fruit units, of the category of the tomato trays described in our prior patent applications identified by Serial Nos. 284,363, 289,506 and 303,063, filed respectively on April 25, 1952, May 23, 1952, and August 7, 1952, and the second filed application now Patent No. 2,680,513, granted June 8, 1954.

It is primarily within our contemplation to provide a package housing a row of tomatoes comprising a preferably transparent plastic tray member enrobed by a transparent flexible wrapping, of a material such as cellophane, it being our objective to present a well ventilated package firmly supporting a row of tomatoes of which substantial portions are exposed to view.

In many conventional tomato packages employing tray members, such as those made of flexible cardboard, a substantially air-tight wrapping is employed, thereby preventing air circulation through the package. Because of the fact that ripening of the fruit occurs more rapidly in a non-ventilated confined space, tomatoes housed within said conventional containers are apt to break down or disintegrate before the package is opened for use. Furthermore, when such an air-tight package, encased in a transparent wrapper such as cellophane, is kept within a refrigerator, there is generally considerable fogging of the inside surface of the wrapper due to vapor condensation. This not only interferes with visibility through the wrapper but also renders the package unsightly. It is accordingly an important object of our invention to provide a tomato supporting tray of such novel construction that, when enrobed in a transparent flexible wrapper, atmospheric air will have access to the interior of the package to provide circulation therein, thereby to lengthen the fruit's ripening period and prevent a condensation of moisture upon the inner surface of the wrapper. And in this aspect of our invention it is a further object to provide the wrapper with both sealed and unsealed overlapping portions, whereby the sealed portions hold the wrapper together and the unsealed portions permit the passage of air therethrough.

It is also within our contemplation to provide a tray with tomato-supporting seats which, though providing an adequate support for each tomato contained within the tray, will nevertheless permit access of air to the depressed stem end of the tomato—the most tender section of the fruit and most readily subject to disintegration under non-circulating air conditions.

It is a further object of our invention to enable the seating pads for the tomatoes to serve the additional purpose of a backing for spaced overlapping marginal portions of the flexible wrapper, so that such portions will be heat-sealed together when operatively brought against said pads by suitable heat-sealing devices. And it is within our contemplation to provide pads that will present adequate areas both for supporting the tomatoes and for the aforesaid backing purposes.

In another aspect of our invention it is a further object to so support inverted tomatoes within the tray as to prevent a flattening thereof at the region adjacent the stem portion, and at the same time prevent any portion of the tomatoes from extending below the base of the tray, thereby preventing the fruits from making contact with a supporting table or conveyor belt.

Other objects, features and advantages will appear from the drawings and the description hereinafter given.

Referring to the drawings.

Figure 1:
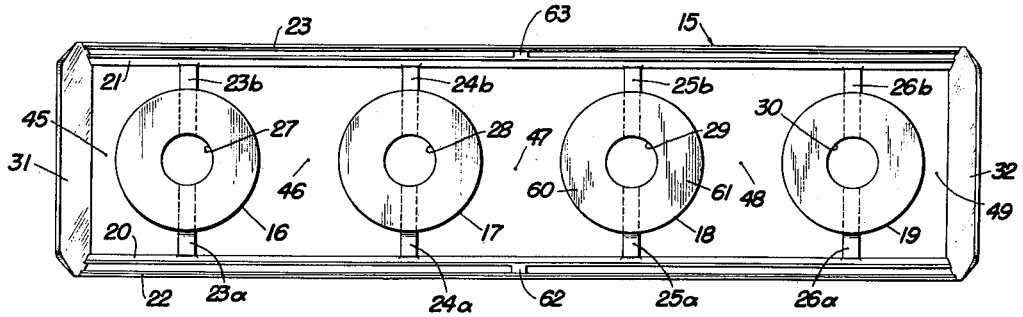
Figure 1 is a plan view showing a form of tray member constituting a component part of our invention.
Figure 2:
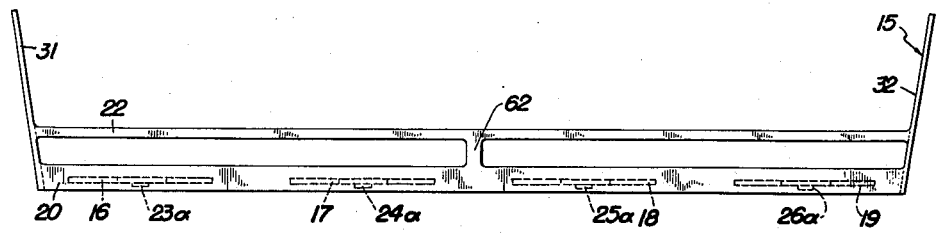
Figure 2 is a front elevational view of Figure 1.
Figure 3:
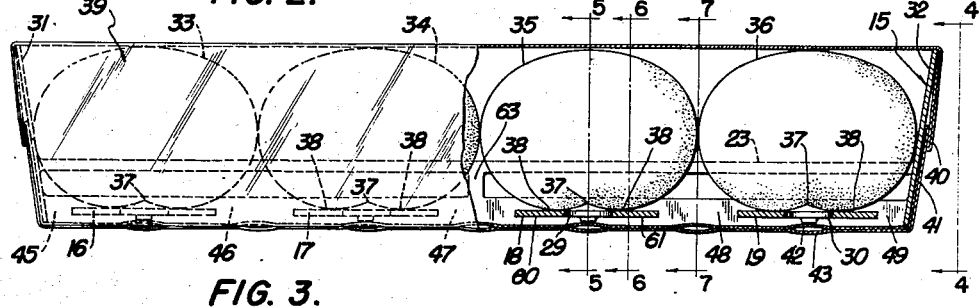
Figure 3 is a front elevational and part sectional view of the tray of Fig. 2 enrobed in a flexible transparent wrapper, a fragment of the wrapper being removed, the sectioned part of the tray being substantially along the medial portion thereof, tomatoes being shown contained within the package.
Figure 4:
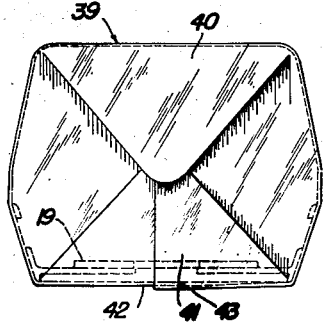
Figure 4 is an end view of Figure 3 looking in the direction of line 4—4.

In the form of our invention illustrated in Figures 1 to 7, the tray member 15 consists of a plurality of tomato seating pads 16, 17, 18 and 19, two longitudinal extending parallel base rails 20 and 21, two longitudinal preferably flexible, parallel upper side rails 22 and 23, transverse supporting bars 23a and 23b supporting pad 16, transverse bars 24a and 24b supporting pad 17, transverse bars 25a and 25b supporting pad 18 and transverse bars 26a and 26b supporting pad 19. Each of said bars is joined to and supported by the opposite base rails 20 and 21. The said pads are preferably flat circular discs, containing therein the central apertures 27, 28, 29 and 30, respectively. It is preferred that the said transverse bars extend from the said base bars 20 and 21 up to said apertured portions, the transverse bars underlying the respective pads. At the ends of the tray are the end walls 31 and 32, the said upper and lower rails being joined thereto.

The said pads 16, 17, 18 and 19 are so proportioned as to receive thereupon the tomatoes 33, 34, 35 and 36, respectively, the depressed stem portions 37 being disposed over and in facing relation to the said apertured portions of the pads. The region of each tomato adjacent and surrounding said stem portion, such as the circular region 38, is disposed upon and in resting engagement with the upper surface of the underlying pad. It is hence apparent that although there is a supporting floor for each of the tomatoes, the tender stem portion is not in engagement with any portion of the pad, and is also in a position to receive circulating air, as will more clearly hereinafter appear.

After the tomatoes are positioned within the tray in the manner aforesaid, the filled container is enrobed by the flexible wrapping 39. This can be done by one of various methods known to those skilled in the art, such as by manual means or by automatic wrapping machinery. The wrapper is so selected that, when it is enrobed about the tray, it presents overlapped end portions 40 and 41 at opposite ends of the tray, as well as overlapping marginal portions 42 and 43 along the underside of the tray. It is preferred that the wrapping be made of conventional transparent heat and pressure sealable material, so that when adjacent portions of such material are brought into contact under heat and pressure, they will become adhesively sealed at such contacting portions. The specific composition of such material need not be described herein, since such materials are well known to those skilled in the art, and further since such a description is not necessary for an understanding of the present invention. Suffice it to say that when overlapped portions, such as portions 40 and 41, are brought into engagement with each other by a suitable heat-sealing die pressing these portions, in known manner, against the end walls 31 and 32, such overlapped portions will be adhesively secured together. Similarly, when longitudinal overlapping portions 42 and 43 are brought against the under-surfaces of adjacent overlying pads 16, 17, 18 and 19, such portions will become sealed to each other, whereas all other portions will remain unsealed. Such an arrangement not only serves to hold the package together, but, as will hereinafter appear, also permits air to enter the package through the unsealed portions.

Figures 3, 5, 6 and 7 illustrate this construction and the functioning thereof. As will be seen from Figure 6, the overlapping portions 42a and 43a are brought into engagement with the under-surface 44 of the pad 18 when pressed upwardly in the direction of arrow A by conventional heat-sealing means (not shown), as indicated by the dot-dash lines; and when the pressure is operatively released, the said overlapping portions 42a and 43a will become lowered substantially to the full-line position shown, under the influence of gravity and internal stress within the wrapper. Since said overlapping portions 42a and 43a are sealed, they will not permit the passage of air therethrough. It is apparent that such sealing engagement will occur at a plurality of spaced regions—in the particular structure illustrated at eight regions, that is, along the two diametrically opposite regions (such as regions 60 and 61) flanking the aperture of each of the four pads shown. The arrangement is hence such that the entire wrapper is maintained in its enrobing position by the said sealed areas.

Figure 5:
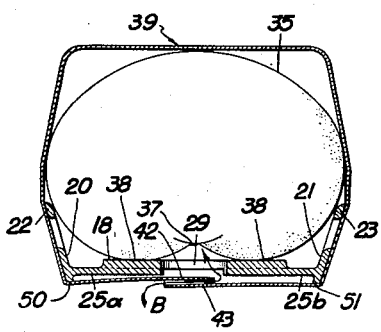
Figure 5 is a somewhat enlarged section of Figure 3 taken along line 5—5.
Figure 6:
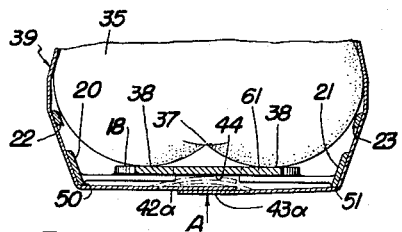
Figure 6 is a somewhat enlarged fragmentary section of Figure 3 taken along line 6—6.
Figure 7:
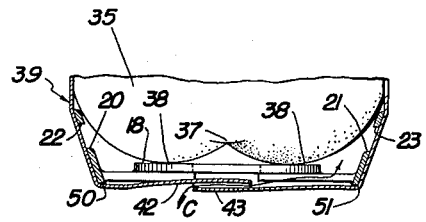
Figure 7 is a somewhat enlarged fragmentary section of Figure 3 taken along line 7—7.

As above indicated, the said marginal overlapping portions are not adhesively secured together in those regions where the pads do not serve as backing members. Such unbacked regions are the apertured portions 27, 28, 29 and 30 of the pads, as well as the open portions 45, 46, 47, 48 and 49 flanking said pads. Figure 5 is an illustration of one of said unbacked regions, and Figure 7 shows another of said regions. Even where overlapping portions 42 and 43 in said unbacked regions are in close proximity, they do not present air-tight sections; such overlapping portions are generally separated and out of contact along substantial parts thereof, thereby admitting air therethrough. The arrow B in Figure 5 shows an open air path between said overlapping portions, the path extending through the aperture 29 of the pad 18 and into the space below the stem end 37 of the tomato 35. The arrow C of Figure 7 shows another air path extending between the overlapping portions 42 and 43 and entering the tray along the lateral side thereof.

It is thus apparent that although a firm package is presented in which tomatoes are safely and adequately supported by the pads without the danger of mutilating the tender stem ends thereof, and the entire tray and fruits enrobed by the firmly secured wrapping, there is nevertheless such circulation of air at the stem ends of the tomatoes, and at other portions thereabout, as to provide the desired condition of ventilation effective in prolonging the ripening period of the tomatoes, and also prevent a fogging and condensation of moisture within the interior of the package.

It will further be observed that the seating pads 16, 17, 18 and 19 are illustrated as being raised slightly above the bottom edges 50 and 51 of the base rails 20 and 21. This not only keeps the said pad members out of contact with an underlying table or any conveyor belt upon which the package may be placed, but also obviates the danger of any tomato, which happens to extend through one of the central apertures in the pads, from coming in contact with said table or conveyor belt. This will reduce the possibility of bruising the tomatoes and also the likelihood of the conveyor frictionally rotating the tomatoes within the package and thereby displacing the tomatoes from their preferred display positions. It will further be noted that the upper rails 22 and 23 are connected to the lower base rails 20 and 21 at their midpoints by the struts 62 and 63, respectively, whereby the free portions of the upper rails will be permitted to flex so as yieldably to support the tomatoes, and thereby further reduce the danger of their being bruised.

Figure 8:
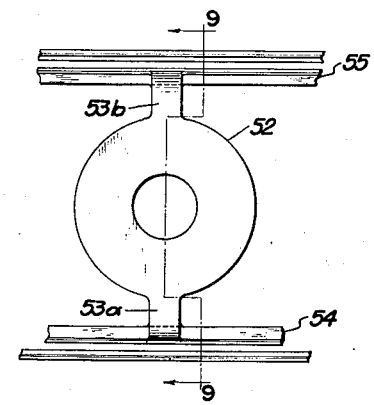
Figure 8 is a fragmentary plan view of a modified form of the tray of our invention.
Figure 9:
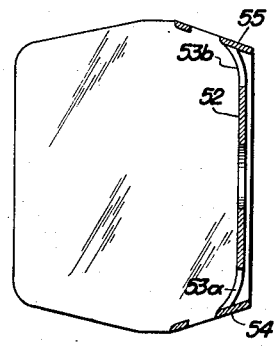
Figure 9 is a section of Figure 8 taken substantially along line 9—9.

In the form of our invention illustrated in Figures 8 and 9, the seating pads 52 are constructed substantially like those above referred to, except that they are supported by oppositely disposed transverse bars 53a and 53b which are supported from the upper portions of the base rails 54 and 55. In this construction the said transverse bars 53a and 53b merge into pads 52 at the planes thereof, and are not in underlying supporting engagement therewith as in the first form above described.

Figure 10:
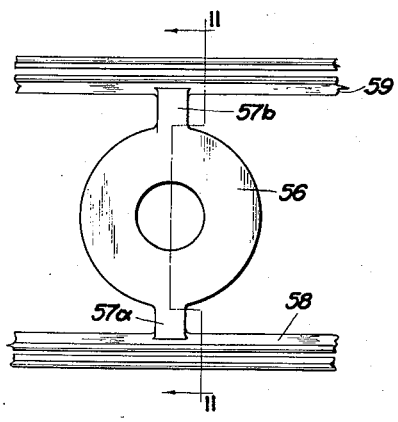
Figure 10 is a fragmentary plan view of another form of the tray of our invention.
Figure 11:
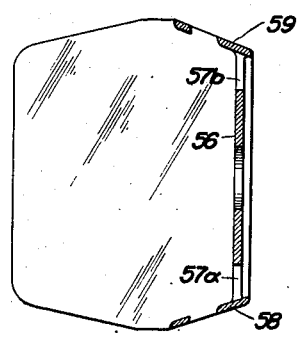
Figure 11 is a section of Figure 10 taken substantially along line 11—11.

In the form of our invention illustrated in Figures 10 and 11, the pads 56 are substantially like those shown in Figure 9, except that they are supported by transverse bars 57a and 57b which are in the plane of the pads and are joined to the base rails 58 and 59 near the bottommost portions thereof. Except for these distinctions, the structure of the modifications of Figures 8 to 11 are similar in general arrangement and function to the form first above described.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

We claim:

1. In a ventilated package for a row of selected fruit units, a plastic tray for receiving said fruit units and arranged to facilitate enrobing of a filled tray, said tray comprising two opposite end walls, a pair of laterally opposite longitudinal base rails extending between said end walls, longitudinally aligned backing members between and rigidly joined to said rails and spaced apart to provide ventilating regions therebetween, said backing members each being of extended proportions for underlying supporting engagement with substantial portions of said selected fruit units, and a flexible sheet enrobing said tray and having overlapped marginal portions underlying said tray and extending longitudinally across and below said backing members, said marginal portions being positioned for bearing contact with said backing members responsive to upwardly directed sealing pressure, and sealed sections at spaced intervals of said marginal portions in underlying relation to said backing members, said sections being located within the area defined by the marginal edges of said backing members, whereby the sealed sections are remote from said ventilating regions and are operatively engageable only with said backing members.

2. In a ventilated package for a row of selected fruit units, a plastic tray for receiving said fruit units and arranged to facilitate enrobing of a filled tray, said tray comprising two opposite end walls, a pair of laterally opposite longitudinal base rails extending between said end walls, a pair of laterally opposite longitudinal side rails disposed between the tops of said end walls and said base rails, longitudinally aligned backing members between and rigidly joined to said base rails in a plane offset upwardly from the lower edges of said end walls, said backing members being spaced apart to provide ventilating regions therebetween, said backing members each being of extended proportions for underlying supporting engagement with substantial portions of said selected fruit units, and a flexible sheet enrobing said tray and having an upper section extending across and in engagement with the tops of said end walls and a bottom section with overlapped marginal portions underlying said tray and extending longitudinally across and below said backing members, said marginal portions being positioned for bearing contact with said backing members responsive to upwardly directed sealing pressure, and sealed sections at spaced intervals of said marginal portions in underlying relation to said backing members, said sealed sections being located within the area defined by the marginal edges of said backing members, whereby the sealed sections are remote from said ventilating regions and are operatively engageable only with said backing members.

3. A ventilated wrapped package prepared for sealing thereof, comprising a plastic tray, a row of fruit units therein, and a wrapping about said tray, said tray comprising two opposite end walls, a pair of laterally opposite longitudinal base rails extending between said end walls, a pair of laterally opposite longitudinal side rails disposed between the tops of said end walls and said base rails, longitudinally aligned backing members between and rigidly joined to said base rails in a plane offset upwardly from the lower edges of said end walls, said backing members being spaced apart to provide ventilating regions therebetween, each of said backing members being of extended proportions and in underlying supporting engagement with a substantial portion of one of said fruit units, said wrapping comprising a flexible sheet enrobing said tray and having an upper section extending across and in engagement with the tops of said end walls and a bottom section with overlapped marginal portions underlying said tray and extending longitudinally across and below said backing members, said marginal portions being positioned for bearing contact with said backing members responsive to upwardly directed sealing pressure, and sealing sections at spaced intervals of said marginal portions in underlying relation to said backing members, said sealing sections being located within the area defined by the marginal edges of said backing members whereby said sealing sections are remote from said ventilating regions and are operatively engageable only with said backing members.

References Cited in the file of this patent

UNITED STATES PATENTS

| | | |
|---|---|---|
| 1,351,739 | Boyd | Sept. 7, 1920 |
| 2,361,344 | Yates | Oct. 24, 1944 |
| 2,368,797 | Bailar | Feb. 6, 1945 |
| 2,476,948 | Sanford | July 19, 1949 |
| 2,556,590 | Long | June 12, 1951 |
| 2,637,481 | Adams, Sr. | May 5, 1953 |
| 2,649,991 | Woock | Aug. 25, 1953 |